US011206222B2

(12) United States Patent
Pal et al.

(10) Patent No.: US 11,206,222 B2
(45) Date of Patent: Dec. 21, 2021

(54) SYSTEM AND METHOD OF MEMORY MANAGEMENT IN COMMUNICATION NETWORKS

(71) Applicant: WIPRO LIMITED, Bangalore (IN)

(72) Inventors: Shyam Sundar Pal, Kolkata (IN); Gopinath Das, Saltlake (IN)

(73) Assignee: Wipro Limited, Bangalore (IN)

( * ) Notice: Subject to any disclaimer, the term of this patent is extended or adjusted under 35 U.S.C. 154(b) by 26 days.

(21) Appl. No.: 16/826,331

(22) Filed: Mar. 23, 2020

(65) Prior Publication Data

US 2021/0250307 A1  Aug. 12, 2021

(30) Foreign Application Priority Data

Feb. 7, 2020  (IN) .............................. 202041005536

(51) Int. Cl.
*G06F 3/06* (2006.01)
*G06F 12/02* (2006.01)
(Continued)

(52) U.S. Cl.
CPC .......... *H04L 47/805* (2013.01); *G06F 12/023* (2013.01); *H04L 5/1438* (2013.01);
(Continued)

(58) Field of Classification Search
CPC .... G06F 12/02; G06F 12/0223; G06F 12/023; H04W 28/16; H04W 28/24; H04L 47/24;
(Continued)

(56) References Cited

U.S. PATENT DOCUMENTS 6,034,945 A  3/2000  Hughes et al.
6,788,697 B1  9/2004  Aweya et al.
(Continued)

OTHER PUBLICATIONS

Technical Specification: LTE; Mission Critical Communication Interworking with Land Mobile Radio Systems (3GPP TS 23.283 version 15.1.0 Release 15), ETSI TS 123 283 v15.1.0 (Jul. 2018) 3GPP5G, 124 pages.
(Continued)

*Primary Examiner* — Rasheed Gidado
(74) *Attorney, Agent, or Firm* — Finnegan, Henderson, Farabow, Garrett & Dunner, LLP

(57) ABSTRACT

Memory management in communication networks is disclosed. The method includes generating a memory allocation trigger for an event based on an event type and estimating a memory size required by the event based on the event type of a user service and at least one configuration parameter. The event type includes a new user service request, a modified user service request, or a network event. The method includes allocating a memory section to the event based on the estimated memory size for the event of the user service and availability of memory blocks in a memory pool, the memory section comprises at least one memory block. The method includes verifying performance of the communication network. Verifying further includes receiving performance feedback for the communication network in response to allocating the memory section for the user service and modifying at least one of the set of configuration parameters.

20 Claims, 11 Drawing Sheets

(51) Int. Cl.
*H04W 28/24* (2009.01)
*H04L 12/927* (2013.01)
*H04L 12/851* (2013.01)
*H04L 29/08* (2006.01)
*H04L 5/14* (2006.01)
*H04L 12/24* (2006.01)

(52) U.S. Cl.
CPC .......... *H04L 41/5025* (2013.01); *H04L 47/24* (2013.01); *H04L 67/322* (2013.01); *H04W 28/24* (2013.01)

(58) Field of Classification Search
CPC ....... H04L 47/80; H04L 47/805; H04L 41/50; H04L 41/5019; H04L 41/5025; H04L 5/1438; H04L 67/32; H04L 67/322
See application file for complete search history.

(56) References Cited

U.S. PATENT DOCUMENTS

| | | | |
|---|---|---|---|
| 7,177,921 B2 * | 2/2007 | Taguchi | H04L 45/302 370/389 |
| 8,392,565 B2 * | 3/2013 | Tripathi | G06F 13/387 709/226 |
| 8,762,532 B2 * | 6/2014 | Kohlenz | H04L 49/90 709/226 |
| 9,558,297 B1 * | 1/2017 | Bailey | G06F 12/023 |
| 10,852,968 B2 * | 12/2020 | Yanagihara | G06F 3/0679 |
| 2009/0254731 A1 | 10/2009 | Maheshwari et al. | |
| 2018/0152269 A1 | 5/2018 | Xiong et al. | |
| 2019/0266077 A1 | 8/2019 | Lyons et al. | |

OTHER PUBLICATIONS

Bonjorn, N., et al., "Cooperative Resource Allocation and Scheduling for 5G eV2X Services", IEEE Access 2017, pp. 1-10.

* cited by examiner

SYSTEM AND METHOD OF MEMORY MANAGEMENT IN COMMUNICATION NETWORKS

TECHNICAL FIELD

The present invention relates to communication networks. More particularly, the present invention relates to a system and method of memory management in communication networks.

BACKGROUND

In the past couple of years, wireless communication has gained a lot of attention and focus. Wireless communication is the fastest growing technological field in communication networks. Examples of wireless communication networks may include, but are not limited to Global System for Mobile (GSM), Infrared, Bluetooth, Wireless Fidelity (W-Fi), Worldwide Interoperability for Microwave Access (WiMAX), and Long Term Evolution (LTE). Wireless communication exhibits a variety of advantages when compared with wired communication. These advantages may include cost, mobility, ease of installation, and reliability.

In the last few years, wireless communication networks have evolved at a very fast pace. This evolution includes transition from the first Generation (1G) wireless networks to the fourth Generation (4G) wireless networks. The 1G wireless network was analog and was used for voice calls only, the second generation (2G) wireless network was based on a digital technology, the third generation (3G) wireless network provided a higher data transmission rate, increased capacity, and multimedia support, and the 4G wireless network integrated the 3G wireless network with fixed internet in order to support wireless mobile internet, which overcame limitations of the 3G wireless networks. The 4G wireless networks are being slowly replaced with much faster and robust fifth generation (5G) wireless networks.

In wireless technologies currently in use, (e.g., 4G, 5G New Radio (NR), etc.) diverse types of user services are provided by a communication network to multiple user devices. The communication network allocates resources to a new service instance requested by users in the communication network. After completion of a service session or instance, these allocated resource may return to the communication network. With increase in service sessions (or instances), frequency of memory allocation and de-allocation also gets amplified, resulting in degradation of service quality. In the communication network, different types of services may be involved that may require different size of memory section for different service sessions. However, it is possible that memory requirement may also be different for a specific service type, by the corresponding service sessions (instances) for different users.

In conventional methods and systems, a number of memory management techniques in the communication networks have been developed. However, in these conventional methods and systems, memory buffer may be shared to manage congestion within a switch amongst a plurality of packet queues in a computer network. One of the conventional methods and systems, provides a mechanism to dynamically compute a common queue threshold value based on an aggregate size of the plurality of packet queues and a predetermined buffer threshold value. The common queue threshold value may then be used to manage the size of each of the plurality of packet queues and thereby manage the buffer. However, none of the conventional methods and systems are capable of providing a service specific method of memory management in radio access networks for multiple users.

SUMMARY

In one embodiment, a method of memory management in communication networks is disclosed. In one embodiment, the method may include dynamically generating a memory allocation trigger for an event received in a communication network, based on an event type associated with the event, wherein the event type may include a new user service request, a modified user service request, or a network event. The method may further include estimating a memory size required by the event based on the event type of a user service and at least one configuration parameter from a set of configuration parameters, wherein the at least one configuration parameter is associated with the event type. The method may further include allocating a memory section to the event based on the estimated memory size for the event of the user service and availability of memory blocks in a memory pool, wherein the memory section comprises at least one memory block. The method may further include verifying performance of the communication network in response to allocating the memory section to the event. Further, verifying the performance may include receiving performance feedback for the communication network in response to allocating the memory section for the user service, and modifying at least one of the set of configuration parameters based on the performance feedback.

In yet another embodiment, a Base Station (BS) configured to perform memory management in communication networks is disclosed. The BS includes a trans-receiver configured to communicate with at least one User Equipment (UE), a processor communicatively to the trans-receiver, and a memory communicatively coupled to the processor, wherein the memory stores processor instructions, which, on execution, causes the processor to dynamically generate a memory allocation trigger for an event received in a communication network, based on an event type associated with the event. The event type comprises a new user service request, a modified user service request, or a network event. The processor instructions further cause the processor to estimate a memory size required by the event based on the event type of a user service and at least one configuration parameter from a set of configuration parameters, such that the at least one configuration parameter is associated with the event type. The processor instructions further cause the processor to allocate a memory section to the event based on the estimated memory size for the event of the user service and availability of memory blocks in a memory pool, such that the memory section comprises at least one memory block. The processor instructions further cause the processor verify performance of the communication network in response to allocating the memory section, such that performance verification may further cause the processor to receive performance feedback for the communication network in response to allocating the memory section for the user service, and modify at least one of the set of configuration parameters based on the performance feedback.

In yet another embodiment, a system for memory management in communication networks is disclosed. The system includes a plurality of UEs, wherein a UE from the plurality of UEs initiates an event, wherein an event type is associated with the event, and at least one BS communicatively coupled to at least one of the plurality of UEs, wherein the BS receives the event. The event type comprises a new user service request, a modified user service request, or a network event. The BS is configured to dynamically generate a memory allocation trigger for an event received in a communication network, based on an event type associated with the event. The BS further estimates a memory size required by the event based on the event type of a user service and at least one configuration parameter from a set of configuration parameters, such that the at least one configuration parameter is associated with the event type. The BS further allocates a memory section to the event based on the estimated memory size for the event of the user service and availability of memory blocks in a memory pool, such that the memory section comprises at least one memory block. The BS further verifies performance of the communication network in response to allocating the memory section, such that performance verification may be executed by receiving performance feedback for the communication network in response to allocating the memory section for the user service, and modifying at least one of the set of configuration parameters based on the performance feedback.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
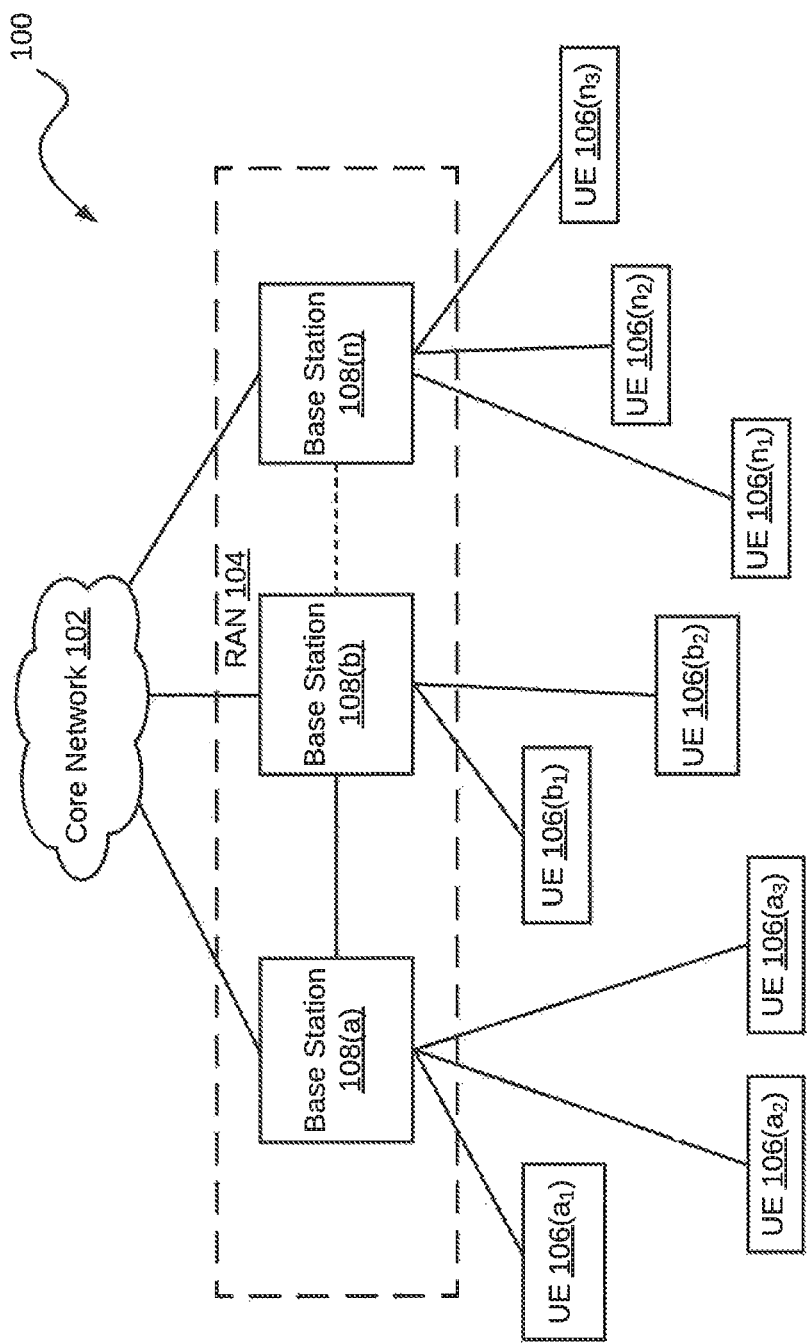
FIG. 1 is a block diagram of a communication network (environment) that may employ various embodiments.

In one embodiment, a communication network 100 (environment) is illustrated in the FIG. 1, various embodiment may be employed in the communication network 100. The communication network 100 may include three components, i.e., a core network (non-access system) 102, a Radio Access Network (RAN) 104, and a plurality of User Equipments (UEs) 106, as depicted in FIG. 1. Examples of the plurality of UEs 106 may include, but is not limited to a mobile phone, a smart phone, a tablet, a phablet, a laptop, a computer with a USB dongle, or a sensor with a simple transmitter. Further, the RAN 104 may be selected from, but is not limited to Global System for Mobile (GSM) RAN (GRAN), GSM Edge RAN (GERAN), Universal Mobile Telecommunication Service (UMTS) Terrestrial RAN (UTRAN), Evolved UTRAN (E-UTRAN), and New Generation RAN (NGRAN). The RAN 104 may further include a plurality of Base Stations (BS) 108. A two-way or duplex interfacing may be provided between various components in the communication network 100. By way of an example, two-way or duplex interfacing may include communication between the RAN 104 and the core network 102, one of the plurality of BSs 108 with other BS from the plurality of BSs 108, and each of the plurality of BSs 108 with at least one of the plurality of UEs 106.

Hence, in the communication network 100, each component is able to deliver as well as receive an information. Each of the plurality of BSs 108 may be communicatively coupled to each other, to at least one of the plurality of UEs 106, and to the core network 102. Each of the plurality of BSs 108 utilize radio waves to relay communications between each of the plurality of UEs 106 and the core network 102. The area covered by a BS from the plurality of BSs 108 may be termed as a cell. Each of the plurality of BSs 108 configured in the RAN 104 may include a transceiver, a processor, and a memory (not shown in FIG. 1). The transceiver may include a transmitter and a receiver to enable communication with at least one of the plurality of UEs 106. The processor may be communicatively coupled to the transceiver in order to perform analysis on the information received from and transmitted to at least one of the plurality of UEs 106. The memory may be communicatively coupled to the processor that stores processor instructions. When the instructions within the memory are executed, the processor performs its operation. The memory may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The core network 102 of the communication network 100 offers several services to the plurality of UEs 106. The core network 102 delivers routes to exchange information among various sub-networks. The core network 102 may include switches and routers (not shown in FIG. 1). The core network 102 utilizes network and data link layer technologies, including Asynchronous Transfer Mode (ATM), IP, Synchronous Optical Networking (SONET), and Dense Wavelength Division Multiplexing (DWDM) for performing its operation. Various features provided by the core network 102 may include aggregation, authentication, call control, call switching, gateways, processing, and collation of charging the data created by multiple network nodes, and service invocation, such as, call forwarding.

Figure 2:
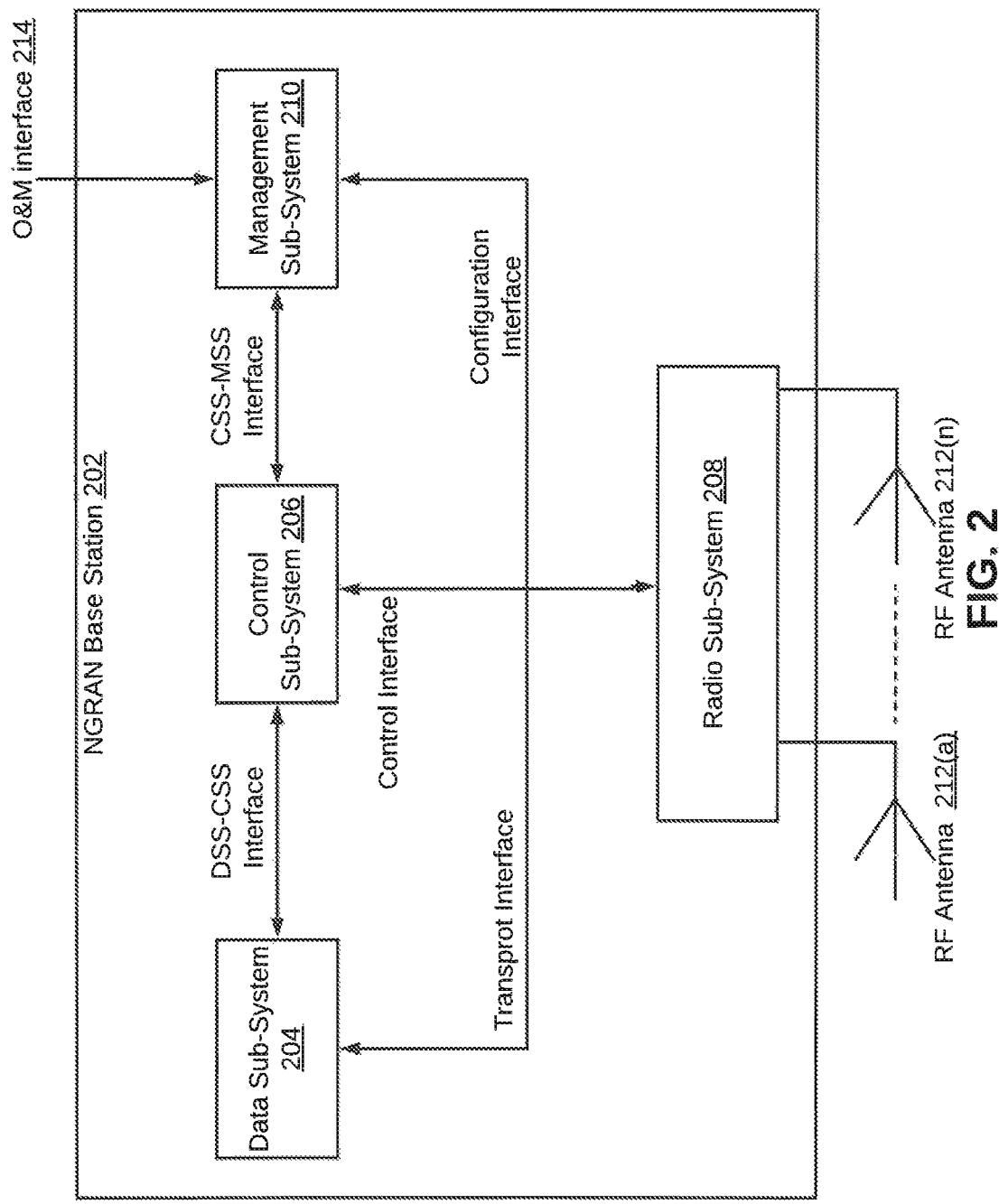
FIG. 2 is a block diagram of various sub-systems within a Next Generation Radio Access Network (NGRAN) Base Station (BS) configured to manage memory within communication networks, in accordance with an embodiment.

Referring now to FIG. 2, a block diagram of various sub-systems within an NGRAN BS 202 is illustrated, in accordance with an embodiment. The NGRAN BS 202 may include various sub-systems for performing multiple functions to provide effective and user specific memory management within communication networks (for example, the communication network 100). The sub-systems of the NGRAN BS 202 may include a Data Sub-System (DSS) 204, a Control Sub-System (CSS) 206, a Radio Sub-System (RSS) 208, a Management Sub-System (MSS) 210, and a plurality of RF antennas 212 (for example, RF antennas 212 (a) and 212 (b)). The DSS 204 is communicatively coupled to the CSS 206 via a DSS-CSS interface and to the RSS 208 via a transport interface. A two-way communication may be provided between the DSS 204 and the RSS 208 as well as the DSS 204 and the CSS 206.

The RSS 208 is communicatively connected to the CSS 206, the MSS 210, the DSS 204, and the plurality of RF antennas 212. There may be two-way communication present between the RSS 208 and all the sub-systems within the NGRAN BS 202.

The MSS 210 is communicatively interlinked between the CSS 206 and the RSS 208 via a CSS-MSS interface and a configuration interface respectively. The MSS-CSS interface may be provided to send control instructions and configuration parameters to the CSS 206 and for receiving a system level measurement data from the CSS 206. The MSS 210 includes a processing module and a memory block (not shown in the FIG. 2). The configuration parameters may be selected from at least one of a timer profile, a memory prediction timer, a service specific Quality Of Service (QoS) threshold, a service specific memory block denomination threshold, a service specific memory size threshold, or a historical memory usage pattern information for at least one of each even type and each user.

Further, the memory block inside the MSS 210 may include a volatile memory and a non-volatile memory. The processing module of the MSS 210 may further include a Radio Resource Management (RRM) module 304 (shown in FIG. 3) and a configuration module (not shown in FIG. 2). The volatile memory may be coupled to the processing module via a volatile memory interface, wherein the processing module stores or retrieves a control data from the volatile memory. The MSS 210 may be accountable for the system level management of co-channel interference, radio resources, and other radio transmission characteristics in the NGRAN BS 202.

The volatile memory of the MSS 210 may store the system level measurement data transmitted by the CSS 206 in its volatile memory. The system level measurement data may be utilized in making decisions by the RRM 304. The system level measurement data represents different measurement metrics, such that, the measurement data may be collected from at least one of the plurality of UEs 106 and calculations may then be done by the CSS 206, the DSS 204, and the RSS 208. The system level measurement data may be utilized in monitoring a prevalent radio network condition, in order to make radio network management decisions.

The non-volatile memory in the MSS 210 stores configuration data received through an operation and management (O&M) interface 214. The processing module accesses the configuration data from the non-volatile memory and configures the CSS 206, the DSS 204, and the RSS 208 through the MSS-CSS interface. The non-volatile memory receives the configuration data from the O&M interface 214 and then directs the configuration data towards evolved Node Base Station (eNB) required for configuration, updating existing configuration, and instantiation of other eNBs. A portion of the non-volatile memory may persist across system-start-up cycles.

The processing module may be a single processor with multiple partitions or multiple independent processors working in a group. The processing module performs a variety of operations, wherein the configuration module handles the overall configuration of the whole eNB system. The configuration module may perform the following services and functions:

(1) Receives the configuration data from the O&M interface 214 and then stores the configuration data into the non-volatile memory.
(2) Brings up the CSS 206, the DSS 204, and the RSS 208.
(3) Configures the CSS 206, the DSS 204, and the RSS 208 with the configuration data stored in the non-volatile memory.
(4) Receives the reconfiguration data from the O&M interface 214 and then reconfigures the CSS 206, the DSS 204, and the RSS 208.
(5) Update an operation and management system in order to modify the configuration data.

The RRM module 304 makes management decisions effectively to run an eNB system. A Self Organized Network (SON) module within the RRM module 304 may perform various functionalities to organize or reorganize the eNB system in a dynamically changing network topology. The functionalities may include the following:

(1) Physical Cell Identity (PCI) self-configuration and self-optimization.
(2) Automatic Neighbor Relation (ANR) management and X2 link auto creation.
(3) Cell outage detection.
(4) Cell coverage optimization.
(5) Collecting live measurement metrics to send an O and M feedback about current condition of the communication network. The decisions may be made using the configuration data and the system level measurement data stored in the MSS 210.

The RRM module 304 may have an admission control to analyze the current network load and the user capability to allow the user connectivity into the communication network. A power control may be provided within the RRM module 304 to analyze different communication network condition in order to measure the transmission power used by the eNB system. A handover control, a sub module in the RRM module 304, analyzes measurement data for different neighboring eNBs to decide a target eNB for the handover purpose. An interference control of the RRM module 304 analyzes the system level measurement data for different neighbor eNBs and reconfigures the eNB to reduce interference from other eNBs.

The CSS 206 may be connected via two-way communication interfaces to the MSS 210, the RSS 208, and the DSS 204. The CSS 206 may be a part of an eNB that carries the control messages for the plurality of UEs 106 and the core network 102. Similar to the MSS 210, the CSS 206 may include a processing module and a memory block (not shown) in addition to an Enhanced Memory Management (EMM) module 308. The memory block may further include two sub-blocks, i.e., a volatile memory and a non-volatile memory. The volatile memory in the CSS 206 stores a control data, for controlling radio access and connection between radio network and UEs. The non-volatile memory in the CSS 206 stores the configuration data received from the O&M interface 214 in the MSS 210. The configuration data received from the MSS 210 by the CSS 206 is termed as configuration data, that may be used to configure the CSS 206 in order to initiate the CSS 206 for executing various functions. The processing module utilizes the configuration data of the non-volatile memory and the processing module either retrieves or stores the configuration data of non-volatile memory. The control data represents the control packets received from or sent to packet core and eNB system to/from user responsible for radio connection establishment, mobility handling, and session establishment and termination.

Further, the processing module includes a Radio Resource Controller (RRC) module 302, an S1AP module (not shown in FIG. 2), and X2AP module (not shown in FIG. 2). Configuration of the RRC module 302 may be accomplished by configuration messages received via the CSS-MSS interface. The RRC module 302 receives configuration data from MSS 210 via the CSS-MSS interface to configure itself. After the configuration of the RRC module 302, the configuration data may be sent to one or more of the plurality of UEs 106 through a PHY interface (not shown in FIG. 2) in downlink and to the core network 102 in uplink. The RRC module 302 receives uplink control packets from a Radio Link Controller (RLC) 312, a Packet Data Convergence Protocol (PDCP) 306, and downlink packets from the S1AP module. On receiving the control packets, the RRC module 302 executes further processing, and performs the following services and tasks:

(1) System information broadcasting for Non-Access Stratum (NAS) and Access Stratum (AS).
(2) Paging.
(3) Establishment, maintenance and release of an RRC connection between the UE and E-UTRAN.
(4) Security handling.
(5) Establishment, configuration, maintenance and release of point to point radio bearers.
(6) Mobility decision processing.
(7) Quality of Service (QoS) management functions.
(8) UE measurement configuration and report handling.
(9) NAS message transfer between one or more of the plurality of UEs 106 and the Core Network 102.

After processing the received packets and performing the desired execution, the RRC module 302 encodes the packets and sends them to a UE module in downlink, the S1AP/X2AP module through an S1-MME interface in uplink, and to a neighbor eNB via an X2 interface. The S1AP module receives configuration data from the MSS 210 through the CSS-MSS interface. The S1AP module processes the configured data, hereafter stores the configuration data in the non-volatile memory. The S1AP module receives the control packets from packet core through an S1-MME interface in downlink and from the RRC module 302 in uplink. After collecting the configuration data, the S1AP module processes the configuration data and performs the following main services and functions:

(1) E-RAB configuration, allocation to/release from user-service-context, etc.
(2) Initial context set up transfer function.
(3) UE capability information.
(4) Mobility functions.
(5) S1 interface establishment and release.
(6) NAS Signaling transport function.
(7) S1 UE context management.

Following the processing of received packets and performing desired execution, the S1AP module encodes the packets and send it to the RRC module 302 in downlink and to packet core through the S1-MME interface in uplink. The X2AP module receives the configuration data from the MSS 210 through the CSS-MSS interface and, then processes the configuration data intending to store the configuration data in the non-volatile memory. The X2AP module receives control packets from the RRC module 302 in uplink and downlink. The X2AP module also gathers the control packets through X2 interface from neighboring eNB. Upon receiving the configuration data, the X2AP module processes the configuration and performs the following main services and functions:

(1) Handover processing.
(2) BS load processing.
(3) $X_2$ interface establishment.
(4) eNB Configuration.

After processing the received control packets and performing the desired function, the X2AP module encodes the control packets and transmit them to the RRC module 302 as well as neighboring eNB via an X2 interface.

Figure 3:
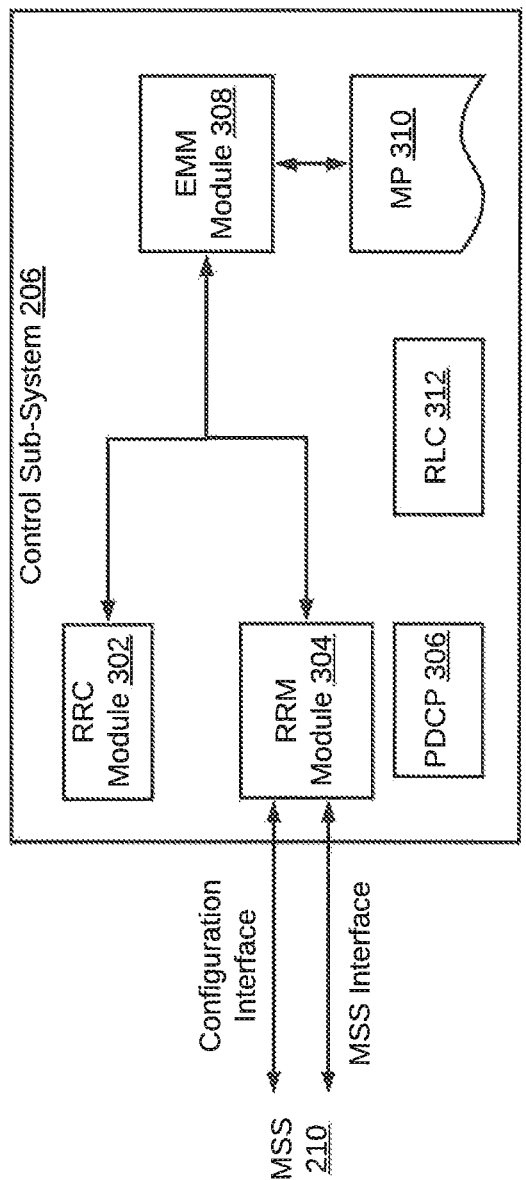
FIG. 3 is a block diagram of a Control Sub-System (CSS) of an NGRAN BS configured to manage memory in communication networks, in accordance with an embodiment.

Referring now to FIG. 3, the CSS 206 within the NGRAN BS 202 configured to manage memory in communication networks is illustrated, in accordance with an embodiment. The CSS 206 may include the RRC module 302, the RRM module 304, the PDCP 306, the EMM module 308, a Memory Pool (MP) 310, and the RLC 312. The main module for memory management of communication networks may be the EMM module 308. The EMM module 308 may effectively manage the memory within the CSS 206. The RRC module 302 may either send or receive the data from the EMM module 308, when a new service request or a modification in existing service request is encountered. Configuration of the RRC module 302 may be accomplished by a configuration messages received via the CSS-MSS interface. The RRC module 302 receives configuration data from the MSS 210 via the CSS-MSS interface to configure itself. After configuration of the RRC module 302, the configuration data may be sent to various UEs through a PHY interface (not shown in FIG. 3) in downlink and to the core network 102 in uplink. The RRC module 302 receives an uplink control packet from the RLC 312, the PDCP 306, and downlink packets from the S1AP module.

On receiving the control packets, the RRC module 302 executes further processing, and performs the following services and tasks:

(1) System information broadcasting for NAS and AS.
(2) Paging.
(3) Establishment, maintenance and release of an RRC connection between the UE and E-UTRAN.
(4) Security handling.
(5) Establishment, configuration, maintenance and release of point to point radio bearers.

(6) Mobility decision processing.
(7) QoS management functions.
(8) UE measurement configuration and report handling.
(9) NAS message transfer between the UE and the core network 102.

After processing the received packets and performing the desired execution, the RRC module 302 encodes the packets and send them to a UE module in downlink, the S1AP/X2AP module through an S1-MME interface in uplink, and to a neighbor eNB via an X2 interface.

The RRM module 304 sends and receives the data from the EMM module 308, when a memory allocation request for a new service request or modification of existing service request is generated. The RRM module 304 makes management decisions effectively to run the eNB system. A SON module within the RRM module 304 performs following functionalities to organize or reorganize the eNB system in a dynamically changing network topology:
(1) PCI self-configuration and self-optimization.
(2) ANR management and X2 Link auto creation.
(3) Cell outage detection.
(4) Cell coverage optimization.
(5) Collecting live measurement metrics to send the O and M feedback about current condition of the network.

The decisions may be made using the configuration data and the measurement data stored in the MSS 210. The MP 310 creates a pool of memory of different block size. In case of receiving a new or modified service request, the required memory may be allocated from the MP 310. The EMM module 308 may be communicatively connected to the RRC module 302, the RRM module 304, and the MP 310. Various components within the EMM module 308 are depicted in FIG. 4 and will be explained in detail in conjunction with FIG. 4.

Figure 4:
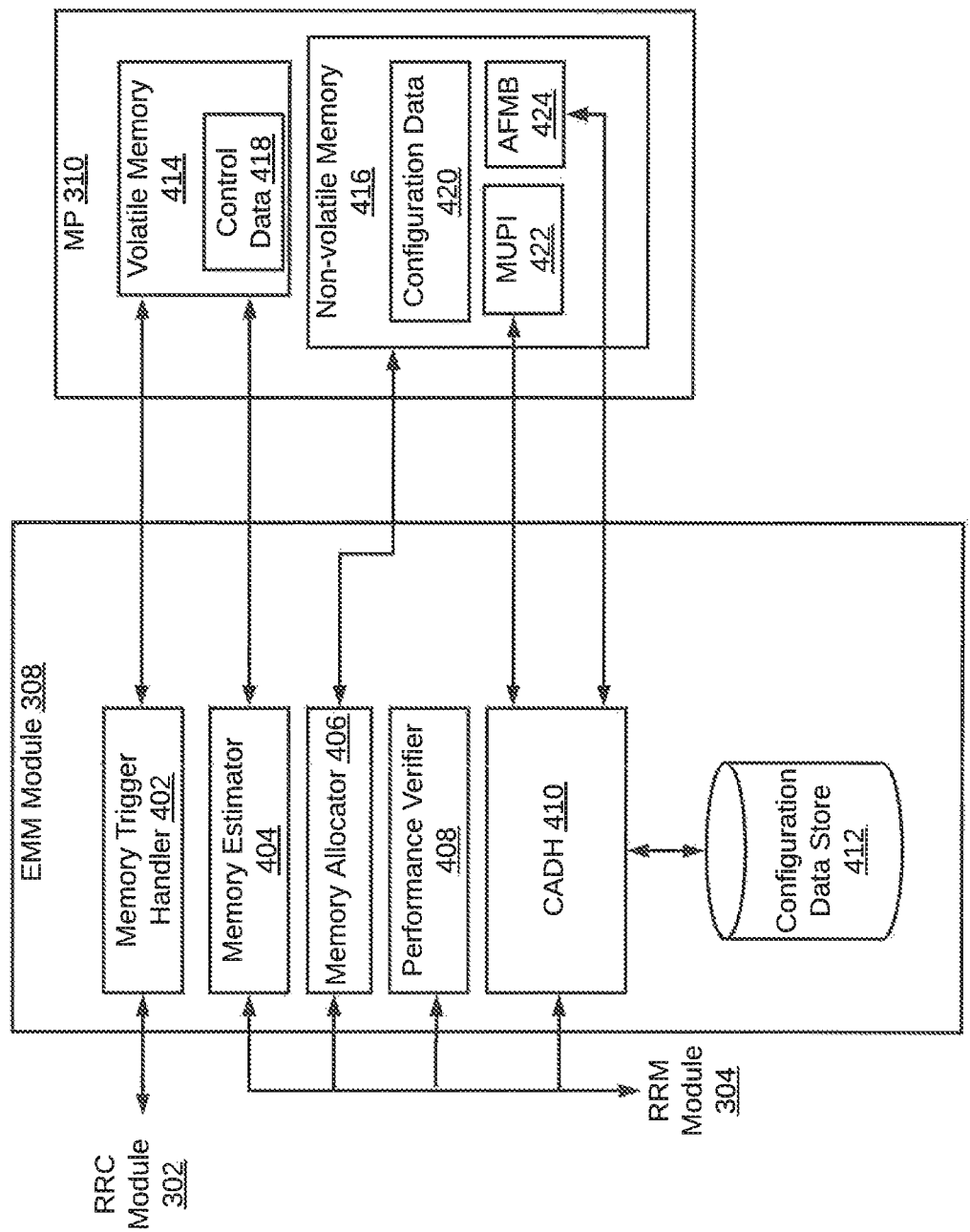
FIG. 4 is a block diagram of an Enhanced Memory Management (EMM) module provided within a CSS, in accordance with an embodiment.

Referring now to FIG. 4, communication between the EMM module 308 and the MP 310 within the CSS 206 is illustrated, in accordance with an embodiment. The EMM module 308 may include a Memory Trigger Handler (MTH) 402, a Memory Estimator 404, a Memory Allocator (MA) 406, a Performance Verifier (PV) 408, a configuration and Accessing Data Handler (CADH) 410, a Configuration Data Store (CDS) 412. The MP 310 may include a volatile memory 414 and a non-volatile memory 416. The EMM module 308 may take responsibility of determining size of different objects and accordingly creates the MP 310 from system space to user space. It creates the MP 310 for different object types depending upon application. In case the object is no longer active, the memory may be released and added in the MP 310 for further use. The MTH 402 may be communicatively coupled to the volatile memory 414. The MTH 402 may be responsible for generating a trigger for a memory event after receiving a user specific request.

The ME 404 may be communicatively coupled to the volatile memory 414. The ME 404 may estimate the memory size required for allocation by the event, based on an event type of a user service and at least one configuration parameter from a set of configuration parameters. The MA 406 may be communicatively coupled to the non-volatile memory 416. The MA 406 may monitor the memory trigger generated for the event for which memory allocation may be needed. The MA 406 may check external as well as internal events for memory allocation trigger. The external events may include memory allocation for any new service or existing service with the requirement of modification. The MA 406 may allocate a memory section to the event based on the estimated memory size for the event of a user service and availability of memory blocks in the MP 310. The PV 408 verifies the performance of the communication network 100 in response to allocating the memory section to the event.

The CADH 410 and the CDS 412 may be communicatively coupled to each other for sending and receiving configuration data. The CDS 412 may store the relevant default and present configuration parameters required for memory allocation for a user specific service. The configuration parameters may include Service Specific Timer Profile (Timerprofilesp) that may be initiated when Timerprofilesp parameter is utilized to determine the memory profile. The configuration parameters may further include Service Specific Memory Prediction Timer (Timermempredsp), initiated when memory prediction for a specific service of a user gets trigger. The configuration parameters also cover a Service Specific QoS Threshold (QoSThsp). When a QOS value for a service of a user goes below the QoSThsp, this parameter may be triggered.

Further, the configuration parameters may include a Service specific memory block denomination Threshold (BDThsp). The BDThsp parameter may be used to verify whether the number of memory block available are below or above this BDThsp value. By way of an example, when the memory allocation request is encountered but there are insufficient memory blocks available, then memory from the MP 310 may not be allocated by the MA 406. The Service Specific Memory Size Threshold (MemSizeThsp) is another configuration parameter, whose value may be used for checking memory block size. It represents a minimum and maximum memory block size for successful memory allocation.

The volatile memory 414 of the MP 310 stores the control data 418, which may be the data used for controlling the radio access and connection between communication network 100 and the UE. On the other hand, the non-volatile memory 416 stores the configuration data 420 received from the O&M interface 214. The data received from the MSS 210 by the CSS 206 may be termed as the configuration data 420 and that may be used to configure the CSS 206 in order to make it effective. The non-volatile memory 416 of the MP 310 may include Memory Usage Pattern Information (MUPI) 422 and Feasible Arrangement of memory blocks (AFMB) 424. The MUPI 422 represents the historic memory usage pattern in terms of different data structure. The MUPI 422 may be utilized for appropriate allocation of the memory to the event of the user service request from the MP 310. The MUPI 422 provides historical information of the memory usage pattern for each service consumed by each user in the communication network 100. The MUPI 422 may be a partial copy of the relevant MUPI entries loaded from the MUPI of the CDS 412 based on active user services at any instance.

The AFMB 424 determines a feasible arrangement of memory-blocks for allocation based on estimated memory size, Block Denomination (BD), best arrangement of memory blocks, and availability of memory blocks in the MP 310. The AFMB 424 represents a memory block arrangement in the form of a queue. Here, the foremost purpose of the AFMB 424 may be to appropriately allocate memory blocks for the events of user service request in the MP 310.

Figure 5:
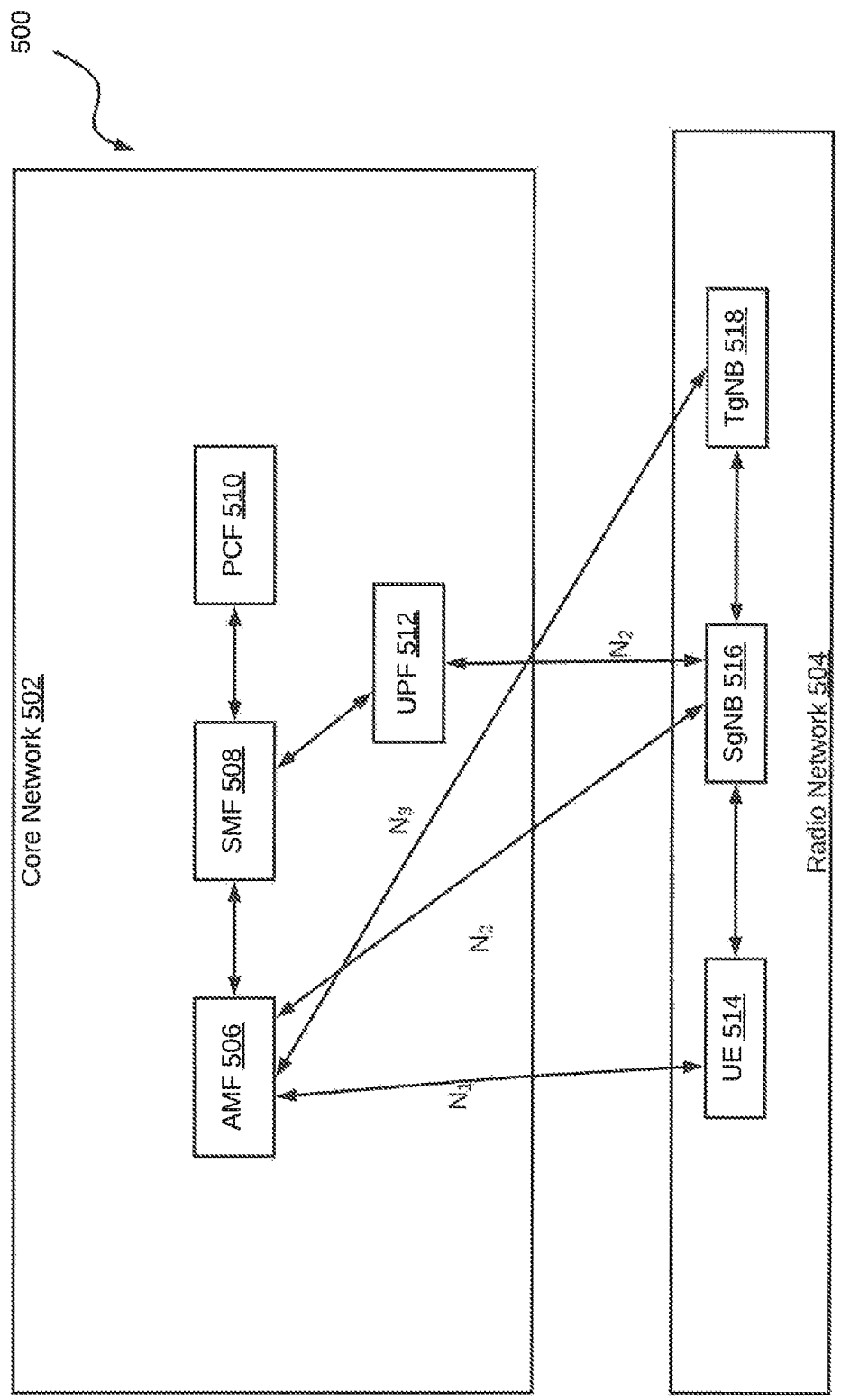
FIG. 5 is a block diagram depicting various sub-systems within a core network configured to manage memory in communication networks, in accordance with an embodiment.

Referring now to FIG. 5, a block diagram 500 depicting various sub-systems within a core network 502 configured to manage memory in the communication network 100 is illustrated, in accordance with an embodiment. The core network 502 is communicatively coupled to the radio network 504. The core network 502 may include an Access and Mobility Function (AMF) 506, a Session Management Function (SMF) 508, a Policy Control Function (PCF), a User plane Function (UPF) 512. The radio network 504 may include a Source gNB (SgNB) 516, a UE 514, and a target gNB (TgNB) 518. The AMF 506 of the core network 502 may be communicatively coupled to the SgNB 516, the UE 514, and the TgNB 518 via N1, N2, N3 respectively. There may be a two-way communication between the core network 502 and the radio network 504. The AMF 506 may perform access and mobility functionality of the core network 504. The AMF 506 may receive a session information from the SMF 508 and QoS related information from the PCF 510. The AMF 506 accepts a "Path Switch Request" from the TgNB 518 and sends the request to the UPF 512 for establishing downlink data path in the UPF 512. After the data path establishment, the AMF 506 directs "Path Switch Request Ack" to the TgNB 518.

The SMF 508 establishes and maintains sessions specific to diversified users. The SMF 508 supervises a session information received for the UE 514 via the SgNB 516. The SMF 508 creates sessions for the UE 514 application in the core network 502. The SMF 508 obtains "PDU Session Update SM Context Request" in order to establish the session. The SMF 508 transmits a "Session Modification Request" to the UPF 512 for establishing a context in data plane.

The PCF 510 handles the QoS information and enforces the QoS information for an application of the UE 514. The PCF 510 collects the session specific information and corresponding QoS requirement for each application from the SMF 508. The PCF 510 may also share the QoS information post enforcement with the SMF 508. In a handover scenario, the PCF 510 receives a "Policy Control Create Request" for policy association of applications in a target PCF. In response, the PCF 510 transmits a "Policy Control Create Response" to the AMF 506. A source PCF may receive a "Policy Control Delete" from the AMF 506 to delete policy association. The PCF 510 may send a "Policy control Delete Response" back to the AMF 506 in case of successful deletion.

The UPF 512 mainly transfers the data in downlink direction received from an external network and in uplink direction received from the UE 514. In handover scenario, when the UPF 512 gets changed, a path switch request message may be received in the core network 503, via the AMF 506. The SgNB 516 may receive "Measurement and Control reports" from the UE 514 in order to determine signal strength for the UE 514. Now, based on the signal strength, the SgNB 516 decides handover of the UE 514 to the TgNB 518. The SgNB 516 may consider application's QoS parameters along with signal strength for initiating the handover. In addition, the SgNB 516 may also check whether there is a possibility to maintain present application's QoS in the TgNB 518. After deciding the handover for the UE 514, the SgNB 516 may send a "Handover Request" that may include an application QoS information.

The TgNB 518 receives the handover request from the SgNB 516. The TgNB 518 may receive the application related QoS information in the "Handover Request." After receiving the handover request, the TgNB 518 estimates the possibility of fulfilling the handover request based on present capacity and load. Here, the application QoS may be considered to maintain the session of the required QoS.

Figure 6:
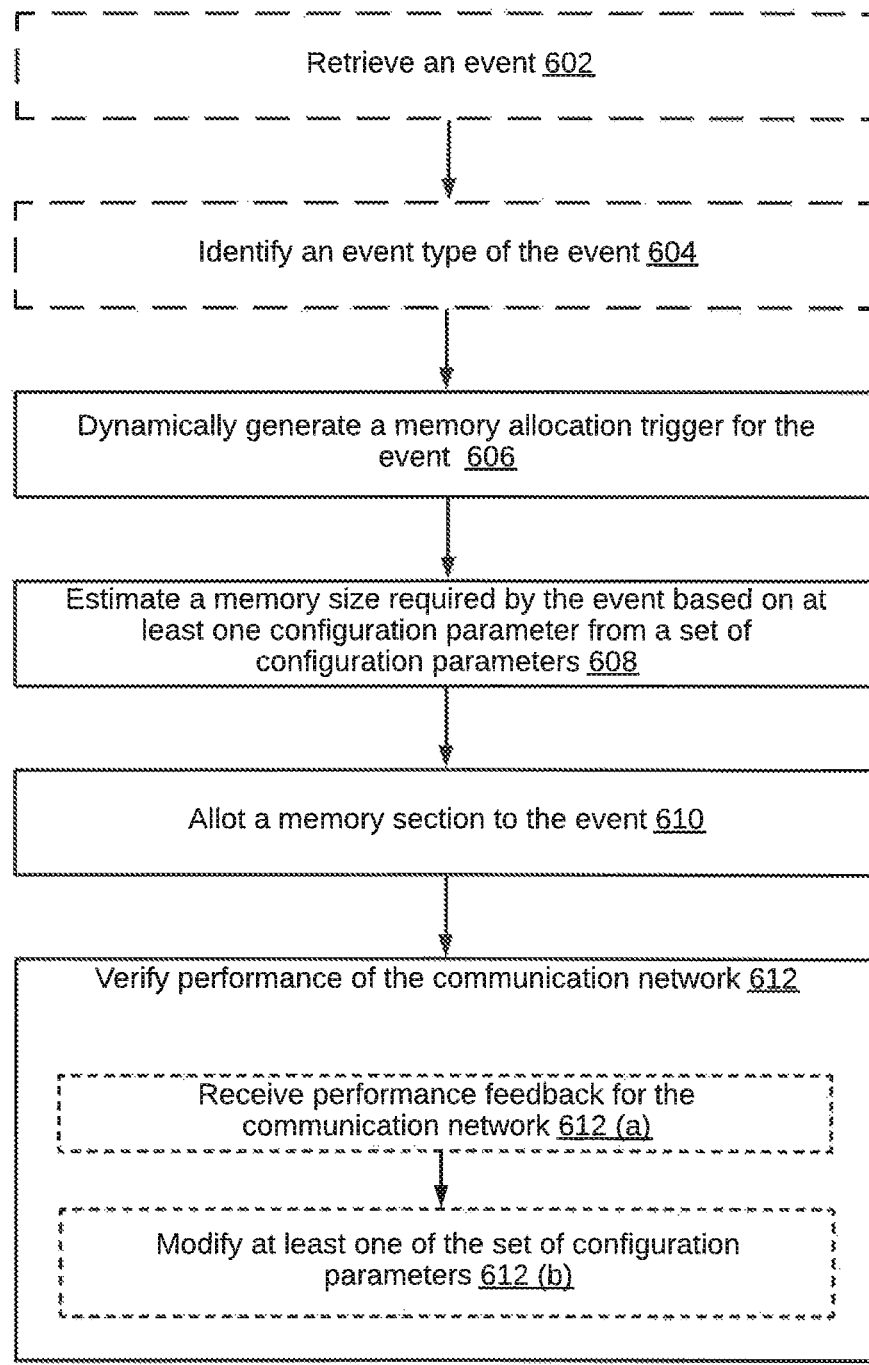
FIG. 6 illustrates a flowchart of a method for memory management in communication networks, in accordance with an embodiment.

Referring now to FIG. 6, a flowchart 600 of a method for memory management in the communication network 100 is illustrated, in accordance with an embodiment. At step 602, a memory management device receives an event of the user service from a UE from the plurality of UEs 106. The memory management device, for example, may be the CSS 206. Thereafter, at step 604, the memory management device may identify an event type associated with the event of the user service. The event type may include a new user service request, a modified user service request, or a network event. The event type may be determined by performing multiple steps. Initially it may be determined whether the event is a user service request or a network event. If the event is a user service request, then Memory Allocation Trigger Handler (MATH) of the EMM module 308 determines whether it is a new user service request or an existing user service request. In other words, MATH checks if the user service request event is associated with an alteration of QoS/Priority parameters of an existing user service request or the event is a new user service request event. Further, on detection of a network event, the MATH raises a memory allocation trigger along with event-details of configuration parameters that may be extracted by the CADH.

At step 606, the memory management device may dynamically generate a memory allocation trigger for the event of the user service, based on the event type associated with the event. Thereafter, at step 608, the memory management device may estimate a memory size required by the event of the user service based on the event type and at least one configuration parameter from a set of configuration parameters.

At step 610, the memory management device may allocate a memory section to the event of the user service based on the estimated memory size for the event of the user service and availability of memory blocks in the MP 310. It may be noted that the memory section includes at least one memory block. Following the step 610, at step 612, the memory management device may verify performance of the communication network 100 in response to allocating the memory section to the event. The step 610, verifying the performance may be executed by performing steps 612 (*a*) and 612 (*b*). At step 612 (*a*), performance feedback for the communication network 100 may be received in response to allocating the memory section. At step 612 (*b*), at least one of the set of configuration parameters may be modified intending to improve the performance of the communication network 100.

Figure 7:
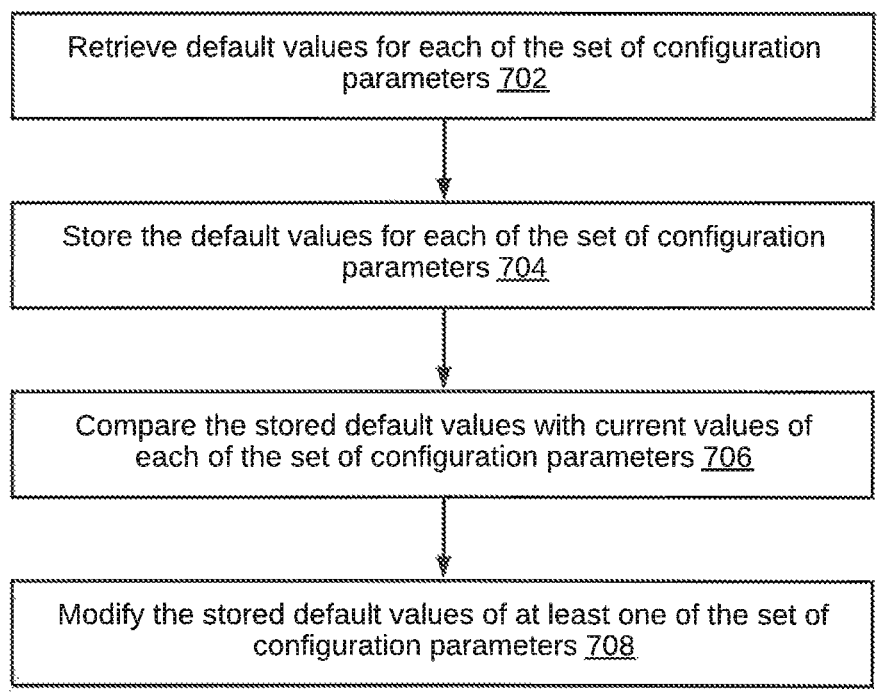
FIG. 7 illustrates a flowchart of a method for initializing a memory management device in a communication network, in accordance with an embodiment.

Referring now to FIG. 7, a flowchart of a method of initializing the memory management device is illustrated, in accordance with an embodiment. At step 702, default values for each of a set of configuration parameters are retrieved. The configuration parameters have already been explained in detail in conjunction with FIG. 2. Thereafter, at step 704, the default values for each of the set of configuration parameters may be stored in a configuration system. At step 706, the stored default values of each of the set of configuration parameters are compared with current values of each of the set of configuration parameters. At step 708, the stored default values of at least one of the set of configuration parameters may be modified based on the comparing executed in the step 706.

While initializing the memory management device, when a new user service request event is encountered, the Configure and Access Default Configuration (CADC) requests the RRM module 304 to provide default configuration parameter values such as Timer Profile (TimerProfileSp), Memory Prediction Timer (TimerMempredSp), ServiceSpecific QoS Threshold (QoSTh), Service specific memory block denomination Threshold (BDThsp), Service Specific Memory Size Threshold (MemSizeThsp). The RRM module 304 obtains default values of the configuration parameters as part of MSS-configuration-data from the MSS 210 through the configuration interface. The RRM 304 delivers the configuration data to the EMM module 308. After receiving the configuration data from the RRM module 304 through an RRM-CADH interface, the CADC loads required values of configuration data into a local memory (configuration memory) as current configuration parameters for the EMM module 308.

On the other hand, when a subsequent event is requested, change in the EMM module 308 configuration parameters may be identified by comparing the default configuration parameters with the current values of the configuration parameters. In case of any change, latest parameters in the CADH 410 may be configured and a local copy of the latest configuration parameters may be stored in the CDS 412. When there is no change in configuration parameter, the CADH 410 loads the current configuration parameters from the memory to the CDS 412 for configuring the CADH 410.

Figure 8:
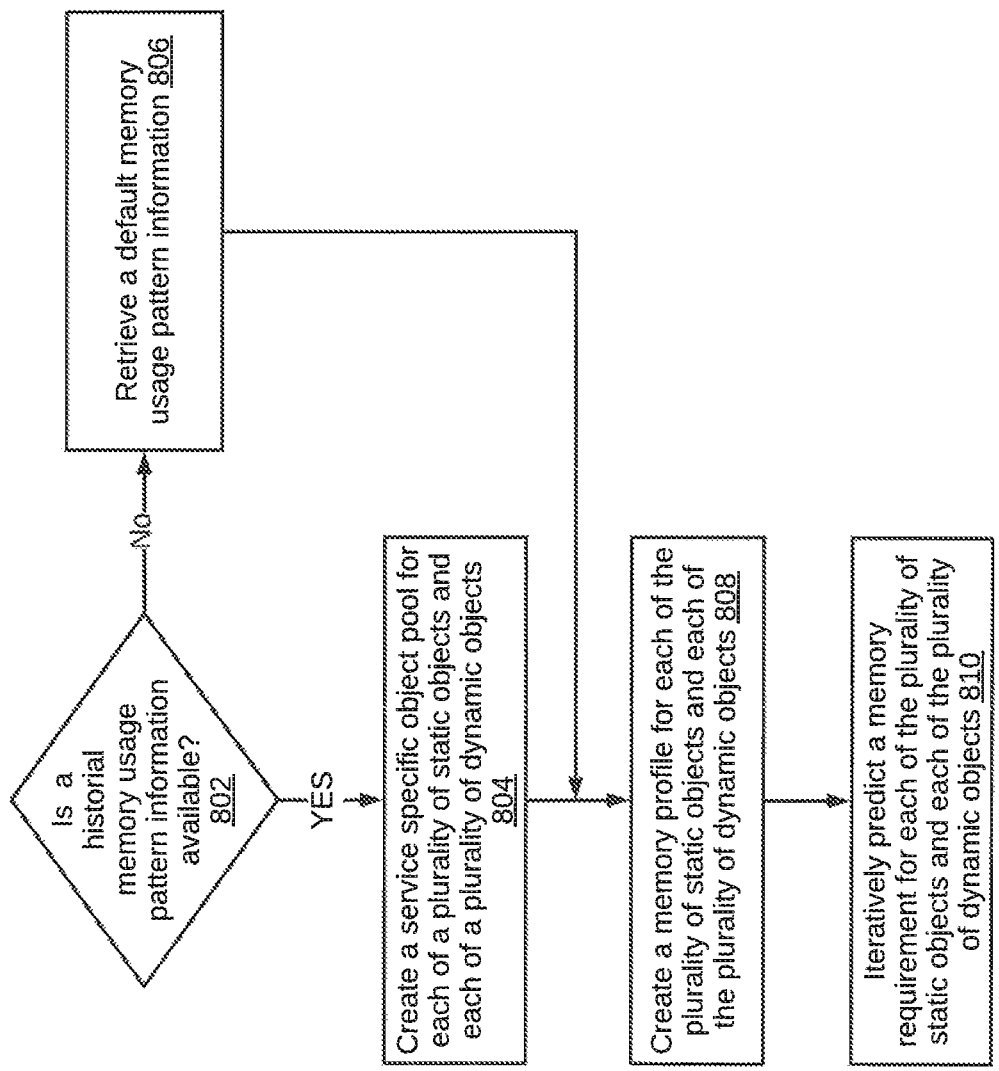
FIG. 8 illustrates a flowchart of a method for estimating memory size required by an event, in accordance with an embodiment.

Referring now to FIG. 8, a flowchart of a method for estimating the memory size required by an event is illustrated, in accordance with an embodiment. Initially, at step 802, the memory management device may perform a check to determine whether a historical memory usage pattern information is available or not. The historical memory usage pattern information may be associated with at least one of the events and the user. In an exemplary embodiment, in case of a new user service request event, the following steps may be executed:
  (a) The CADH 410 determines availability of MUPI entry in the volatile memory 414 related to user specific service request,
  (b) the CADH 410 checks availability of MUPI for the same type of user requests,
  (c) if MUPI is available, then the CADH 410 extracts MUPI from the volatile memory 414,
  (d) the CADH 410 receives the default values, and
  (e) the CADH 410 puts the MUPI information in cache memory.

The above steps, i.e., steps (a) to (e) are repeated for each new service for a user. When the historical memory usage pattern information is available, the method may proceed towards step 804. At step 804, a service specific object pool for each of a plurality of static objects and each of a plurality of dynamic objects associated with the event may be created. The creation of service specific object pool may depend on the corresponding memory requirement. In case the historical MUPI is available, the EMM module 308 may load relevant portion of the MUPI from persistence store to its own memory. In an exemplary embodiment, size of an object may be calculated by performing the following steps:
  (a) Receive a variety of events in the communication network 100
  (b) Determine $k_{th}$ object of the user specific service request
  (c) Determine the size of the object ObjSize(k)
  (d) Determine the number of the object as ObjNum
  (e) Store the number of objects of same size as ObjInfo <ObjSize, ObjNum>
  (f) Store the different types of objects information as pool in ObjPool <ObjInfo <ObjSize, ObjNum>>
  (g) Repeat steps (a) to (f) for all objects of the service.
  (h) Repeat the steps (a) to (g) for each user specific service in the communication network 100.

Referring back to step 802, in case the historical memory usage pattern information associated with at least one of the events and the user is unavailable, the memory management device retrieves a default memory usage pattern information, at step 806. In an embodiment, if the memory usage pattern information is unavailable, the EMM module 308 raises memory-usage-pattern generation request with a memory pattern generation module (not shown). The memory pattern generation module may create a MUPI table for the specific service of the user. For creating the MUPI table, the EMM module 308 may load a default memory usage pattern information. The default memory usage pattern information may be loaded for a specific service of a user. In an exemplary embodiment, the memory pattern generation module may perform the following steps:
  (a) Check PattGen (j) completion status from the memory pattern generation module for pattern generation task for each service request of UE in the network.
  (b) Load relevant portion of MUPI (j) into memory of the EMM module 308 memory.
  (c) Check the availability of MUPI data in MUPI (j) repository
  (d) In absence of MUPI data in the EMM module 308 raises memory-usage-pattern generation request with the memory pattern generation module for that particular user/service
  (e) The memory pattern generation module creates a pattern for the new user with specified service request.
  (f) The memory pattern generation module stores the created MUPI in the persistent memory.
  (j) Repeat steps (a) to (f) for each service of the user in the network.

At step 808, a memory profile is created for each of the plurality of static objects and each of the plurality of dynamic objects. The creation of memory profile may depend on service specific object pool and historical memory usage pattern information. In an exemplary embodiment, the following steps may be performed:
  (a) Receive each service (j) of user (i).
  (b) Start profile timer Timerprofilesp to determine the memory profile for each jth object pool in ObjPool <ObjInfo <ObjSize, ObjNum>>.
  (c) Receive MUPI (j) for each service.
  (d) Determine the number of object allocation of specific size ObjSize as ObjAlloc <ObjSize, ObjNum>
  (e) Determine the total memory allocation of specific size TotalObjAlloc <ObjSize, ObjNum, j>.
  (f) Determine the number of object deallocation specific size ObjSize as ObjDealloc <ObjSize, ObjNum>.
  (g) Determine the total memory deallocation of specific size TotalObjDEalloc <ObjSize, ObjNum, j>.
  (h) Determine maximum number of objects MaxObj <ObjSize, ObjNum> used in timer Timerprofilesp.
  (i) Store the memory profile for timerProfileMem <MaxObj, Timerprofilesp> in Timerprofilesp.
  (j) Continue until Timerprofilesp has expired.
  (k) Repeat steps (a) to (j) for each service of the user in the communication network 100.

At step 810, a memory requirement may be iteratively predicted for each of the plurality of static objects and each of the plurality of dynamic objects for a load condition. In an exemplary embodiment, the following steps may be performed:
  (a) Determine each service of user (UE) in the network
  (b) Start profile timer Timermempredsp to predict the memory profile
  (c) Receive the memory ProfileMem
  (e) Determine the Constant Memory (MemConst) required by the application in Timermempredsp
  (f) Determine the Variable memory MemVol required by the application in Timermempredsp (g) Predict the total memory usage MemTot <ObjSize> of object ObjSize and continue step (c), until Timermempredsp has expired.

(h) Repeat steps (a) to (g) for each service of the user.

Figure 9:
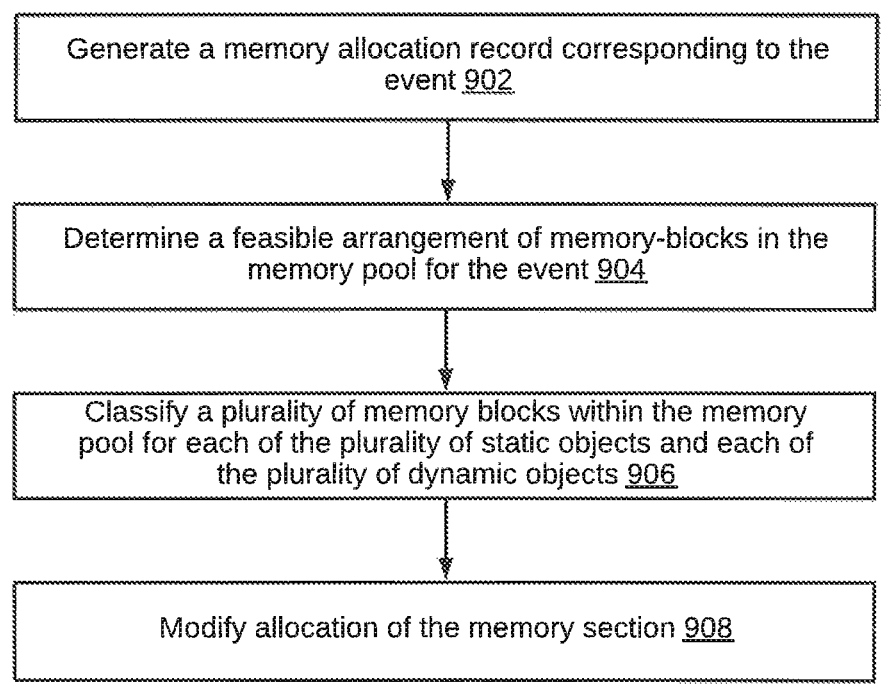
FIG. 9 illustrates a flowchart of a method for allocating a memory section to an event, in accordance with an embodiment.

Referring now to FIG. 9, a flowchart of a method for allocating a memory section to an event is illustrated, in accordance with an embodiment. At step 902, a memory allocation record is generated corresponding to the event. After the generation of the memory allocation record, at step 904, a feasible arrangement of memory-blocks in the MP 310 may be determined for the event. The arrangement determination may be implemented according to the memory allocation record, the estimated memory size for the event, and the memory block denomination.

At step 906, classification of a plurality of memory blocks within the MP 310 is done for each of the plurality of static objects and each of the plurality of dynamic objects. The classification may depend on the predicted memory usage. In an exemplary embodiment, the plurality of memory blocks may be classifies based on the following steps:

(a) Receive each service (j) of user (i)

(b) Create a pool of different size using Block Denomination (BD) for each object, ObjSize used in the iteration k.

(c) Determine the pool of the different object size as MemPool (ObjSize, i)=func (LOAD,ObjSize,MAXi)+ DELTAi Where, DELTAi is the hysteresis for the MP 310.

(d) Check if ObjSize <BDThsp.

(e) If true Sort the pool list as MemPool <sort>.

(f) The pool is a sorted list and each list item is a queue of object of same size.

(g) Repeat steps (a) to (f) for each object of service of the user.

At step 908, allocation of the memory section may be modified. The modification may be done by allocating and deallocating memory sections according to the requirement. In an exemplary embodiment, the allocation and deallocation may be performed by executing the following steps:

(a) Receive each service (j) of user (i).

(b) Search the pool for allocation specific size of object ObjSize.

(c) Get the object from the pool for allocating memory.

(d) Allocate memory for the object and remove memory from list. (No need to check, lock, unlock as it is guarded by the DELTA).

(e) Search the pool for de-allocation specific size of object ObjSize.

(f) Get the object from the pool for de-allocating memory.

(g) Add to the released object memory at the queue tail. (No need to check, lock, unlock as it is guarded by the DELTA).

(h) Repeat steps (a) to (g) for each object of user specific service request event.

Figure 10:
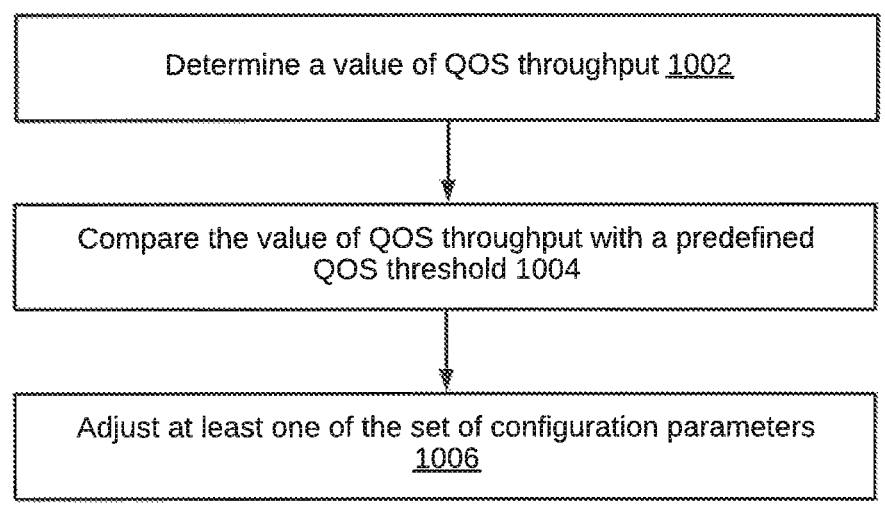
FIG. 10 illustrates a flowchart of a method for verifying performance of the communication network, in accordance with an embodiment.

Referring now to FIG. 10, a flowchart of method for verifying performance of the communication network 100 is illustrated, in accordance with an embodiment. At initial step 1002, a value of QOS throughput may be determined in order to verify the performance of the communication network 100. After determining the value of QOS throughput, a comparison may be done between the value of QOS throughput and a predefined QOS threshold, at step 1004. Now, at step 1006, at least one of the set of configuration parameters may be adjusted based on the comparison.

Figure 11:
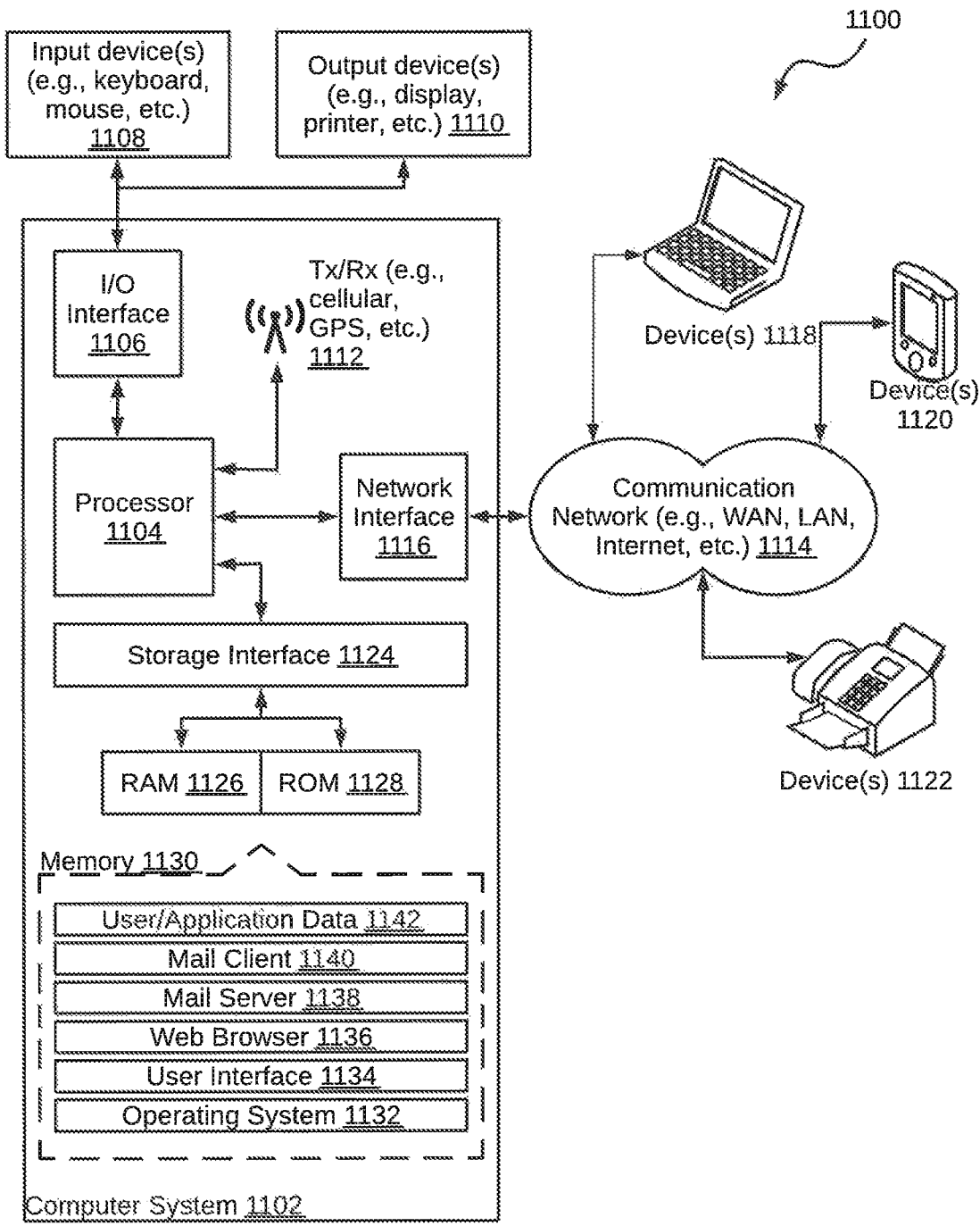
FIG. 11 illustrates a block diagram of an exemplary computer system for implementing embodiments consistent with the present disclosure.

Referring now to FIG. 11, a block diagram of an exemplary computer system 1102 for implementing various embodiments is illustrated. Computer system 1102 may include a central processing unit ("CPU" or "processor") 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM45501UB8® transceiver, INFINEON TECHNOLOGIES X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLES Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBES FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLES SAFARI web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for memory management in communication networks. The proposed method provides effective and optimized memory management in wireless communication networks. Moreover, the proposed method provides mechanism for dynamic and need based memory management for service specific usage. This ensures optimal performance in wireless communication networks.

The specification has described method and system for memory management in communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of memory management in communication networks, the method comprising:
   dynamically generating, by a memory management device, a memory allocation trigger for an event received in a communication network, based on an event type associated with the event, wherein the event type comprises a new user service request, a modified user service request, or a network event;
   estimating, by the memory management device, a memory size required by the event based on the event type of a user service and at least one configuration parameter from a set of configuration parameters, wherein the at least one configuration parameter is associated with the event type;
   allocating, by the memory management device, a memory section to the event based on the estimated memory size for the event of the user service and availability of memory blocks in a memory pool, wherein the memory section comprises at least one memory block; and
   verifying, by the memory management device, performance of the communication network in response to allocating the memory section to the event, wherein verifying the performance comprises:
      receiving performance feedback for the communication network in response to allocating the memory section for the user service; and
      modifying at least one of the set of configuration parameters based on the performance feedback.

2. The method of claim 1, further comprising initializing the memory management device, wherein initializing the memory management device comprises:
   retrieving default values for each of the set of configuration parameters; and
   storing the default values for each of the set of configuration parameters in a configuration system.

3. The method of claim 2 further comprising:
   comparing the stored default values of each of the set of configuration parameters with current values of each of the set of configuration parameters; and
   modifying the stored default values of at least one of the set of configuration parameters based on the comparing.

4. The method of claim 1, wherein the set of configuration parameters comprises at least one of timer profile, memory prediction timer, service specific Quality Of Service (QoS) threshold, service specific memory block denomination threshold, service specific memory size threshold, or historical memory usage pattern information for at least one of each even type and each user.

5. The method of claim 1, further comprising identifying the event type associated with the event of the user service.

6. The method of claim 1, wherein estimating the memory size required by the event comprises:
   determining availability of a historical memory usage pattern information associated with at least one of the event and the user;
   creating a service specific object pool for each of a plurality of static objects and each of a plurality of dynamic objects associated with the event, based on the corresponding memory requirement;
   creating a memory profile for each of the plurality of static objects and each of the plurality of dynamic objects based on the corresponding service specific object pool and the corresponding historical memory usage pattern information; and
   iteratively predicting a memory requirement for each of the plurality of static objects and each of the plurality of dynamic objects for a load condition of the communication network.

7. The method of claim 6, further comprising retrieving a default memory usage pattern information, when the historical memory usage pattern information associated with at least one of the events and the user is unavailable.

8. The method of claim 1, wherein allocating the memory section comprises:
   generating a memory allocation record corresponding to the event;
   determining a feasible arrangement of memory-blocks in the memory pool for the event based on the memory allocation record, the estimated memory size for the event, and memory block denomination; and
   classifying a plurality of memory blocks within the memory pool for each of the plurality of static objects and each of the plurality of dynamic objects based on the predicted memory usage.

9. The method of claim 8, further comprising modifying allocation of the memory section, wherein modifying comprises allocating and deallocating of memory sections.

10. The method of claim 1, wherein verifying the performance of the communication network comprises:
    determining a value of QOS throughput;
    comparing the value of QOS throughput with a predefined QOS threshold; and adjusting at least one of the set of configuration parameters based on the comparing.

11. A Base Station (BS) configured to perform memory management in communication networks, the BS comprising:
a trans-receiver configured to communicate with at least one User Equipment (UE);
a processor communicatively to the trans-receiver;
a memory communicatively coupled to the processor, wherein the memory stores processor instructions, which, on execution, causes the processor to:
dynamically generate a memory allocation trigger for an event received in a communication network, based on an event type associated with the event, such that the event type comprises a new user service request, a modified user service request, or a network event;
estimate a memory size required by the event based on the event type of a user service and at least one configuration parameter from a set of configuration parameters, such that the at least one configuration parameter is associated with the event type;
allocate a memory section to the event based on the estimated memory size for the event of the user service and availability of memory blocks in a memory pool, such that the memory section comprises at least one memory block; and
verify performance of the communication network in response to allocating the memory section to the event, such that performance verification comprises:
receive performance feedback for the communication network in response to allocating the memory section for the user service; and
modify at least one of the set of configuration parameters based on the performance feedback.

12. The BS of claim 11, wherein the processor instructions further cause the processor to:
retrieve default values for each of the set of configuration parameters; and
store the default values for each of the set of configuration parameters in a configuration system.

13. The BS of claim 11, wherein the processor instructions further cause the processor to:
compare the stored default values of each of the set of configuration parameters with current values of each of the set of configuration parameters; and
modify the stored default values of at least one of the set of configuration parameters based on the comparing.

14. The BS of claim 11, wherein the processor instructions further cause the processor to identify the event type associated with the event.

15. The BS of claim 11, wherein the processor instructions further cause the processor to:
determine availability of a historical memory usage pattern information associated with at least one of the event and the user;
create a service specific object pool for each of a plurality of static objects and each of a plurality of dynamic objects associated with the event, based on the corresponding memory requirement;
create a memory profile for each of the plurality of static objects and each of the plurality of dynamic objects based on the corresponding service specific object pool and the corresponding historical memory usage pattern information; and
iteratively predict a memory requirement for each of the plurality of static objects and each of the plurality of dynamic objects for a load condition of the communication network.

16. The BS of claim 11, wherein the processor instructions further cause the processor to retrieve a default memory usage pattern information, when the historical memory usage pattern information associated with at least one of the events and the user is unavailable.

17. The BS of claim 12, wherein the processor instructions further cause the processor to:
generate a memory allocation record corresponding to the event;
determine a feasible arrangement of memory-blocks in the memory pool for the event based on the memory allocation record, the estimated memory size for the event, and memory block denomination; and
classify a plurality of memory blocks within the memory pool for each of the plurality of static objects and each of the plurality of dynamic objects based on the predicted memory usage.

18. The BS of claim 12, wherein the processor instructions further cause the processor to modify allocation of the memory section, wherein modifying comprises allocating and deallocating of memory sections.

19. The BS of claim 12, wherein the processor instructions further cause the processor to:
determine a value of QOS throughput;
compare the value of QOS throughput with a predefined QOS threshold; and
adjust at least one of the set of configuration parameters based on the comparison.

20. A system for memory management in communication networks, the system comprising:
a plurality of User Equipments (UEs), wherein a UE from the plurality of UEs initiates an event, wherein an event type is associated with the event, and wherein the event type comprises a new user service request, a modified user service request, or a network event;
at least one Base Station (BS) communicatively coupled to at least one of the plurality of UEs, wherein the BS receives the event, and wherein the BS is configured to:
dynamically generate a memory allocation trigger for an event received in a communication network, based on an event type associated with the event,
estimate a memory size required by the event based on the event type of a user service and at least one configuration parameter from a set of configuration parameters, such that the at least one configuration parameter is associated with the event type;
allocate a memory section to the event based on the estimated memory size for the event of the user service and availability of memory blocks in a memory pool, such that the memory section comprises at least one memory block; and
verify performance of the communication network in response to allocating the memory section to the event, such that performance verification comprises:
receive performance feedback for the communication network in response to allocating the memory section for the user service; and
modify at least one of the set of configuration parameters based on the performance feedback.

* * * * *